J. R. GAMMETER.
GUARD RIM FOR PNEUMATIC TIRES.
APPLICATION FILED MAR. 25, 1916.
1,194,285.
Patented Aug. 8, 1916.
2 SHEETS—SHEET 1.
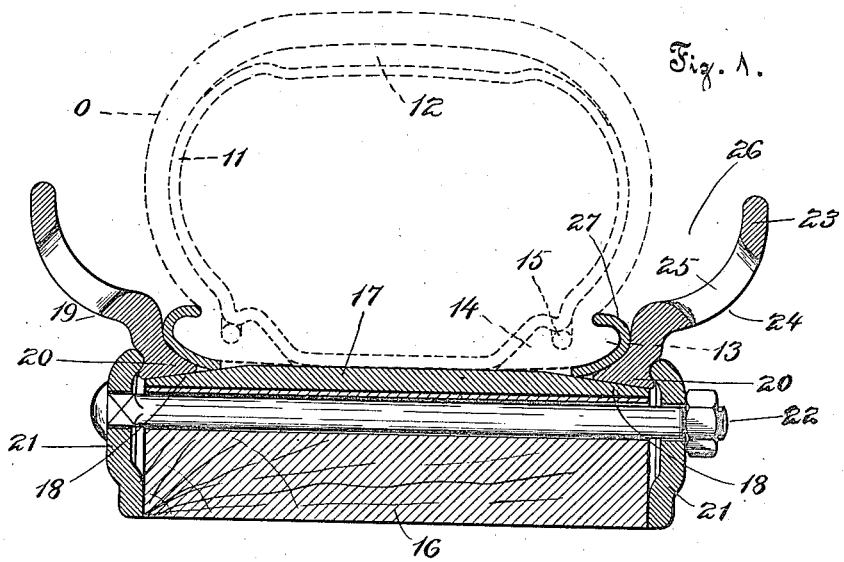
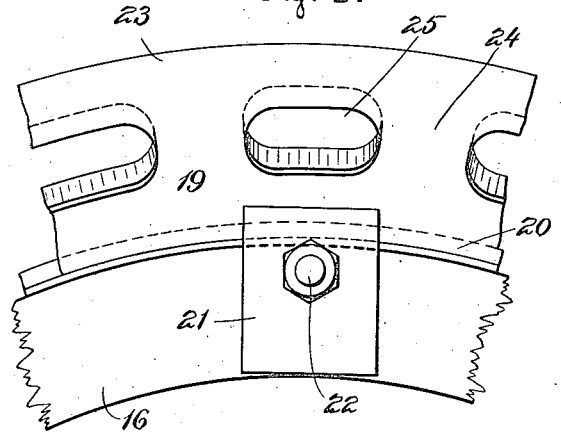
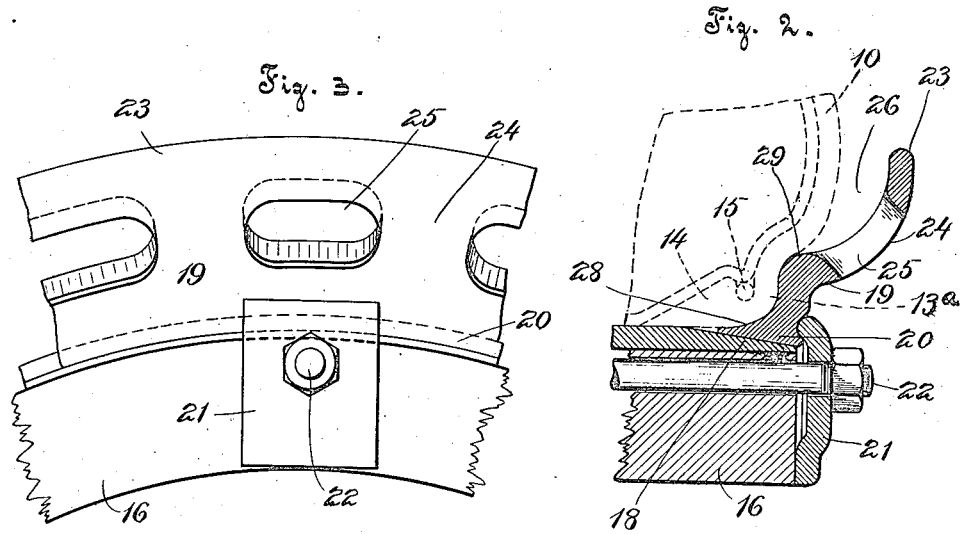
INVENTOR.
J. R. GAMMETER
BY Robert M. Pierson
ATTORNEY J. R. GAMMETER.
GUARD RIM FOR PNEUMATIC TIRES.
APPLICATION FILED MAR. 25, 1916.
1,194,285.
Patented Aug. 8, 1916.
2 SHEETS—SHEET 2.
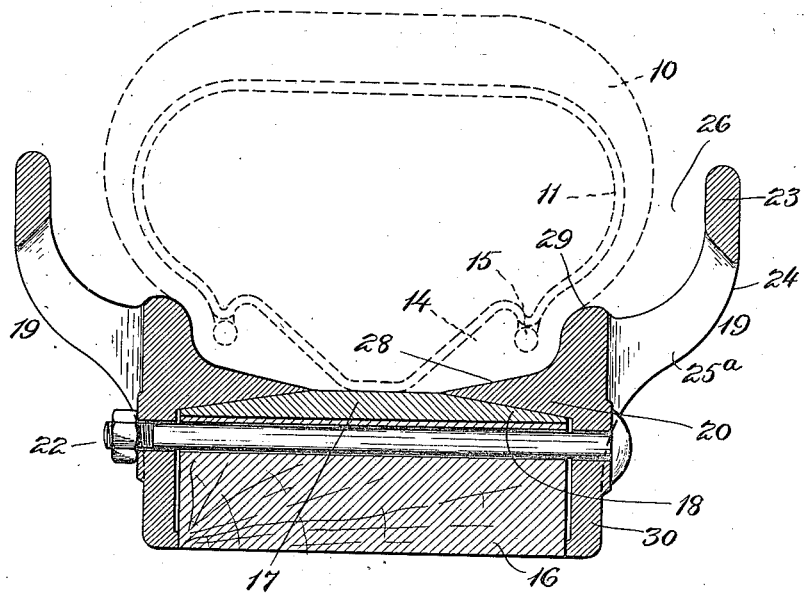
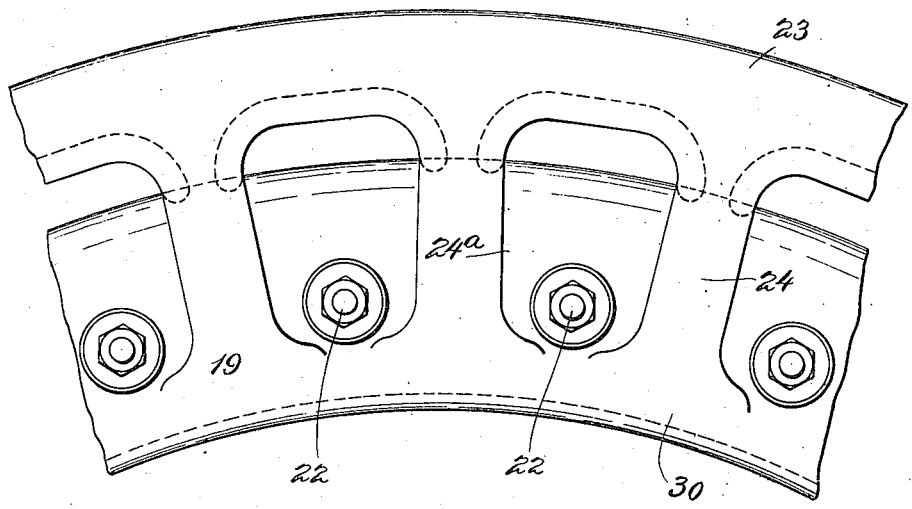
INVENTOR.
J. R. GAMMETER
BY Robert M. Pierson
ATTORNEY

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

GUARD-RIM FOR PNEUMATIC TIRES.

1,194,285.

Specification of Letters Patent.

Patented Aug. 8, 1916.

Application filed March 25, 1916. Serial No. 86,582.

*To all whom it may concern:*

Be it known that I, JOHN R. GAMMETER, a citizen of the United States, residing at Akron, in the county of Summit and State of Ohio, have invented certain new and useful Improvements in Guard-Rims for Pneumatic Tires, of which the following is a specification.

This invention relates to pneumatic-tired wheel-rims, and its object is to provide a guard structure on the felly, adapted to protect the sides of the tire from chafing against curbs, the sides of ruts, etc., and incidentally to provide a secondary supporting surface for contact with the ground in order to prevent injury to the tire in case the latter should become deflated. A guard rim of this character is particularly desirable in connection with broad tires of flattened or oblate section, on account of the unusual width of the tire which renders it more subject to lateral abrasion than the ordinary type, and because of the greater cost of replacing an expensive tire of this kind when injured.

Guard structures heretofore proposed have been deficient in several particulars which I have remedied by means of the expedients hereinafter described, those expedients including means for allowing the tire to expand or flex naturally at the sides when in its normal condition as well as when deflated, and at the same time to avoid the accumulation of stones and other foreign objects, mud, snow, ice, and road material generally, in the spaces between the tire and the guard rings; means for preventing chafing of the tire against the guard rings; and means for supporting the rings adequately upon the felly and relieving the strain on the tie-bolts.

Of the accompanying drawings, Figure 1 represents a transverse section of a wheel felly provided with guard rings embodying my invention, a pneumatic tire of the reversed-bead clencher type being shown in dotted lines. Fig. 2 represents a fragmental sectional view of the same in connection with a tire of the reversed-bead straight-side type. Fig. 3 represents a partial side elevation. Fig. 4 represents a full sectional view corresponding to Fig. 2, showing a modification. Fig. 5 represents a side elevation of said modification.

This application as to the subject matter shown in Figs. 4 and 5 and as to the fundamental inventive idea is a continuation of my application Serial No. 875,086, filed December 2, 1914.

Referring at first to Figs. 1, 2 and 3, 10 indicates a tire casing and 11 an inner tube which are retained in a flattened or oblate section by an inextensible band 12, whereby the tire is given a broad supporting surface particularly adapted for motor trucks and other heavy vehicles. My invention however, may be used in any situation where it is found desirable. The tire beads or edges and the bead-retaining means may be of any suitable construction or shape. In Fig. 1 are shown clencher edges 13 of the reversed-bead type with thickened feet or margins 14 and inwardly-open grooves containing endless rings or cables 15. Fig. 2 shows the straight-side reversed-bead type of tire edge and Fig. 4 shows the same.

16 is the felly, with a metallic felly band 17 thereon, formed outwardly with tapering flange seats 18. It will be understood that when the wheel has a metal felly dispensing with a separate felly-band, these seats 18 are formed on the equivalent part of the felly. The two tire-retaining and guard members on the respective sides are of similar form and each consists of a ring 19 having an annular inner portion or flange 20 overlying and deriving radial support from the felly, and tapering to fit the flange seats 18 on the felly band. These rings are removably secured in place by clamping plates 21 and lateral tie-bolts 22. This form of support is of special utility in view of the strains and blows to which the guard member is subjected, and the occasional necessity which exists for supporting the vehicle on the ground by means of the guard ring when the tire becomes deflated or unduly flexed.

23 is an annular terminal portion connected with the base portion of the ring by integral arms or bridges 24 between which are apertures 25 which facilitate the escape of any road material or foreign objects entering the free space between the guard member and the tire. This annular portion 23 is located radially outward from and at one side of the base portion 20 of the ring, and is situated about midway radially of the tire 10, and it and the bridges are normally separated from the tire by a substantial space 26, which permits the normal flexure of the tire under load, and also accommodates it without injury in a condition of extreme flexure or when the tire is deflated.

The same ring 19 may be used with either a straight-side or clencher bead by allowing the tire to seat directly against the ring, as in Fig. 2, when the bead is of a straight-side form, and using filler rings 27 and cutting away the toe of the supporting portion 20 to a small extent when the bead is of the clencher form as in Fig. 1, but obviously the clencher tire can be used with a single guard ring 19 of appropriate form. Referring more particularly to Fig. 2, it will be noted that the outer surface 28 of the supporting portion 20 forms a part of the tire seat (and forms such seat indirectly in Fig. 1) while the outer rounded shoulder 29 forms a further portion of said tire seat which comes into action progressively as the deflection increases and merges with the curved inner surface of the bridges 20, whereby the tire is at all times adequately supported at and near its base without undue chafing.

The modification shown in Figs. 4 and 5 differs from the form of my invention just described, in that in place of using separate clamps, the guard rings 19 are formed with continuous side-plates or flanges 30 flanking the felly and bolted in place by the tie-rods 22. In this case, the heads of the bolts or tie-rods are located substantially in the spaces 25ª between the bridges, and it is to be noted that said spaces are outwardly flared so as to facilitate the escape of stones, ice and other objects which may enter the spaces.

Various other modifications may be made without departing from my invention.

I claim:

1. The combination of a wheel-felly having a pneumatic tire thereon, a guard ring secured to the felly on one side and having a seat for the tire base, an adjacent edge portion normally separated from the tire-wall but adapted progressively to support the latter under increasing load and flexure, and an open-work guard portion terminating about midway radially of the tire and separated therefrom by a substantial space when the tire is distended, and tire-retaining means on the opposite side of the felly.

2. The combination of a wheel-felly adapted to support a resilient tire, a guard and tire-retaining structure on one side of the felly having an annular tire-guarding and emergency supporting member, situated radially outward from and at the side of the felly, and a laterally-projecting portion overlying the felly and deriving radial support therefrom, removable retaining means engaging said structure for securing the latter to the felly, and tire-retaining means on the opposite side of the felly.

3. The combination of a wheel felly having a pneumatic tire thereon, a guard and tire-retaining ring on one side, overlying and deriving radial support from the felly, said ring outwardly forming a part of the tire seat and having an annular portion situated about midway of, and normally separated by a substantial space from, the side of the inflated tire and adapted to act as a guard and emergency supporting member, a series of clamps provided with lateral bolts for removably securing said ring in place, and tire-retaining means on the opposite side of the felly.

4. The combination of a wheel felly having a pneumatic tire thereon and a tapering flange seat, a guard and tire-retaining structure on one side of the felly having a lateral flange wedge-shaped in section, abutting inwardly against said flange-seat and outwardly forming a portion of the tire seat, the outer part of said structure forming a further portion of said tire seat, and a guard portion separated by a substantial space from the tire when the latter is distended and terminating radially about midway of said tire, clamps and lateral bolts for removably securing said structure to the felly, and tire-retaining means on the opposite side of the felly.

5. A guard and tire-retaining structure for attachment to a wheel felly, the same comprising a ring adapted to be attached to the felly at the side thereof, said ring having a laterally-projecting portion on one side adapted to be radially supported on the felly-band, and an annular guard portion on the other side located radially beyond said laterally-projecting portion and connected therewith by spaced integral arms or bridges.

In testimony whereof I have hereunto set my hand this 24 day of March, 1916.

JOHN R. GAMMETER.